US012125661B2

(12) United States Patent
Song et al.

(10) Patent No.: US 12,125,661 B2
(45) Date of Patent: Oct. 22, 2024

(54) X-RAY TUBE

(71) Applicant: ELECTRONICS AND TELECOMMUNICATIONS RESEARCH INSTITUTE, Daejeon (KR)

(72) Inventors: Yoon-Ho Song, Daejeon (KR); Jun-Tae Kang, Daejeon (KR); Jae-Woo Kim, Daejeon (KR); Sora Park, Daejeon (KR); Jin-Woo Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 209 days.

(21) Appl. No.: 17/872,782

(22) Filed: Jul. 25, 2022

(65) Prior Publication Data

US 2023/0036147 A1 Feb. 2, 2023

(30) Foreign Application Priority Data

Jul. 28, 2021 (KR) ........................ 10-2021-0099061
Jun. 2, 2022 (KR) ........................ 10-2022-0067839

(51) Int. Cl.
*H01J 35/06* (2006.01)
*H01J 35/04* (2006.01)
*H01J 35/10* (2006.01)

(52) U.S. Cl.
CPC .......... *H01J 35/064* (2019.05); *H01J 35/045* (2013.01); *H01J 35/10* (2013.01)

(58) Field of Classification Search
None
See application file for complete search history.

(56) References Cited

U.S. PATENT DOCUMENTS 7,949,099 B2 5/2011 Klinkowstein
2013/0121473 A1* 5/2013 Yamazaki ............... H01J 35/16 378/121
2013/0129046 A1* 5/2013 Yamazaki ............... H01J 35/02 378/62
2013/0284948 A1* 10/2013 Iwamoto ............. C04B 35/6455 250/493.1

(Continued)

FOREIGN PATENT DOCUMENTS

JP 4876047 B2 2/2012
KR 10-2021-0070205 A 6/2021

*Primary Examiner* — Edwin C Gunberg

(57) ABSTRACT

Provided is an X-ray tube including a cathode structure, an anode spaced apart from the cathode structure, a spacer structure disposed between the cathode structure and the anode, and an external power supply connected to each of the cathode structure, the anode, and the spacer structure. Here, the spacer structure includes a first spacer disposed adjacent to the cathode structure and a second spacer disposed on the first spacer and disposed adjacent to the anode. The first spacer includes a first portion adjacent to the cathode structure and a second portion adjacent to a contact point of the first spacer and the second spacer. The second spacer includes a third portion adjacent to the contact point and a fourth portion adjacent to the anode. Each of the first portion and the third portion has a volume resistivity less than that of the second portion.

16 Claims, 6 Drawing Sheets

(56) References Cited

U.S. PATENT DOCUMENTS

| | | | | |
|---|---|---|---|---|
| 2014/0161232 | A1 | 6/2014 | Jeong | |
| 2018/0247787 | A1 | 8/2018 | Jeong | |
| 2019/0318903 | A1 * | 10/2019 | Ishii | H01J 35/16 |

* cited by examiner

X-RAY TUBE

CROSS-REFERENCE TO RELATED APPLICATIONS

This U.S. non-provisional patent application claims priority under 35 U.S.C. § 119 of Korean Patent Application Nos. 10-2021-0099061, filed on Jul. 28, 2021, and 10-2022-0067839, filed on Jun. 2, 2022, the entire contents of which are hereby incorporated by reference.

BACKGROUND

The present disclosure herein relates to an X-ray tube.

An X-ray tube generates electrons in a vacuum container and accelerates the electrons toward an anode to which a high voltage is applied so that the accelerated electrons collide with a metal target on the anode, thereby generating an X-ray. Here, a voltage difference between the anode and a cathode is defined as an acceleration voltage that accelerates electrons. The X-ray tube accelerates electrons with an acceleration voltage of several kV to several hundreds kV according to purposes thereof.

SUMMARY

The present disclosure provides a structure of an X-ray tube that is driven stably even at a high voltage.

An embodiment of the inventive concept provides an X-ray tube including: a cathode structure; an anode spaced apart from the cathode structure; a spacer structure disposed between the cathode structure and the anode; and an external power supply connected to each of the cathode structure, the anode, and the spacer structure. Here, the spacer structure includes: a first spacer disposed adjacent to the cathode structure; and a second spacer disposed on the first spacer and disposed adjacent to the anode, the first spacer includes a first portion adjacent to the cathode structure and a second portion adjacent to a contact point of the first spacer and the second spacer, the second spacer includes a third portion adjacent to the contact point and a fourth portion adjacent to the anode, the first portion and the fourth portion are spaced apart from each other with the second portion and the third portion therebetween, and each of the first portion and the third portion has a volume resistivity less than that of the second portion.

In an embodiment, the fourth portion may have a volume resistivity greater than that of the third portion.

In an embodiment, the external power supply may apply a ground voltage to the contact point of the first spacer and the second spacer, a negative voltage may be applied to the cathode structure, and a positive voltage may be applied to the anode.

In an embodiment, the cathode structure may include: a cathode; and an emitter disposed on the cathode, and the first portion may contact the cathode.

In an embodiment, the cathode structure may include: a cathode; an emitter disposed on the cathode; and an additional electrode disposed over the cathode and the emitter. Here, the additional electrode may include an opening that exposes the emitter, and the first portion may contact the additional electrode.

In an embodiment, the cathode structure may include: a cathode; an emitter disposed on the cathode; and a plurality of additional electrodes that are spaced vertically from each other between the cathode and the anode. Here, each of the additional electrodes may include an opening that exposes the emitter, and the first portion may contact the additional electrode disposed closest to the anode among the additional electrodes.

In an embodiment, the X-ray tube may further include a metal layer disposed between the second portion and the third portion, and the metal layer may be disposed at the contact point.

In an embodiment, each of the first spacer and the second spacer may include a ceramic material, and the ceramic material may include at least one of alumina ($Al_2O_3$), zirconia ($ZrO_2$), and yttria ($Y_2O_3$).

In an embodiment, the first spacer and the second spacer may include the same ceramic material and further include impurities doped in the ceramic material, and a concentration of impurities of each of the first portion and the third portion may be greater than that of the second portion.

In an embodiment, the concentration of the impurities of the third portion may be greater than that of the fourth portion.

In an embodiment, the first spacer and the second spacer may include different ceramic materials.

In an embodiment, each of the first portion and the third portion may have a resistivity of about $1\times10^{12}$ Ω·cm or less, and each of the second portion and the fourth portion may have a resistivity greater than about $1\times10^{12}$ Ω·cm.

In an embodiment, the X-ray tube may further include at least one metal layer disposed on at least one of outer circumferential surfaces of the first portion and the third portion.

In an embodiment, the X-ray tube may further include a conductive structure disposed between the first spacer and the second spacer, and the conductive structure may have a curved shape.

In an embodiment, the X-ray tube may further include a window passing through the conductive structure.

In an embodiment, the conductive structure may be connected to a ground power.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In addition, the sizes of the elements and the relative sizes between elements may be exaggerated for further understanding of the present invention.

Unless terms used in embodiments of the present invention are differently defined, the terms may be construed as meanings that are commonly known to a person skilled in the art. Hereinafter, the present invention will be described in detail by explaining preferred embodiments of the invention with reference to the attached drawings.

Figure 1:
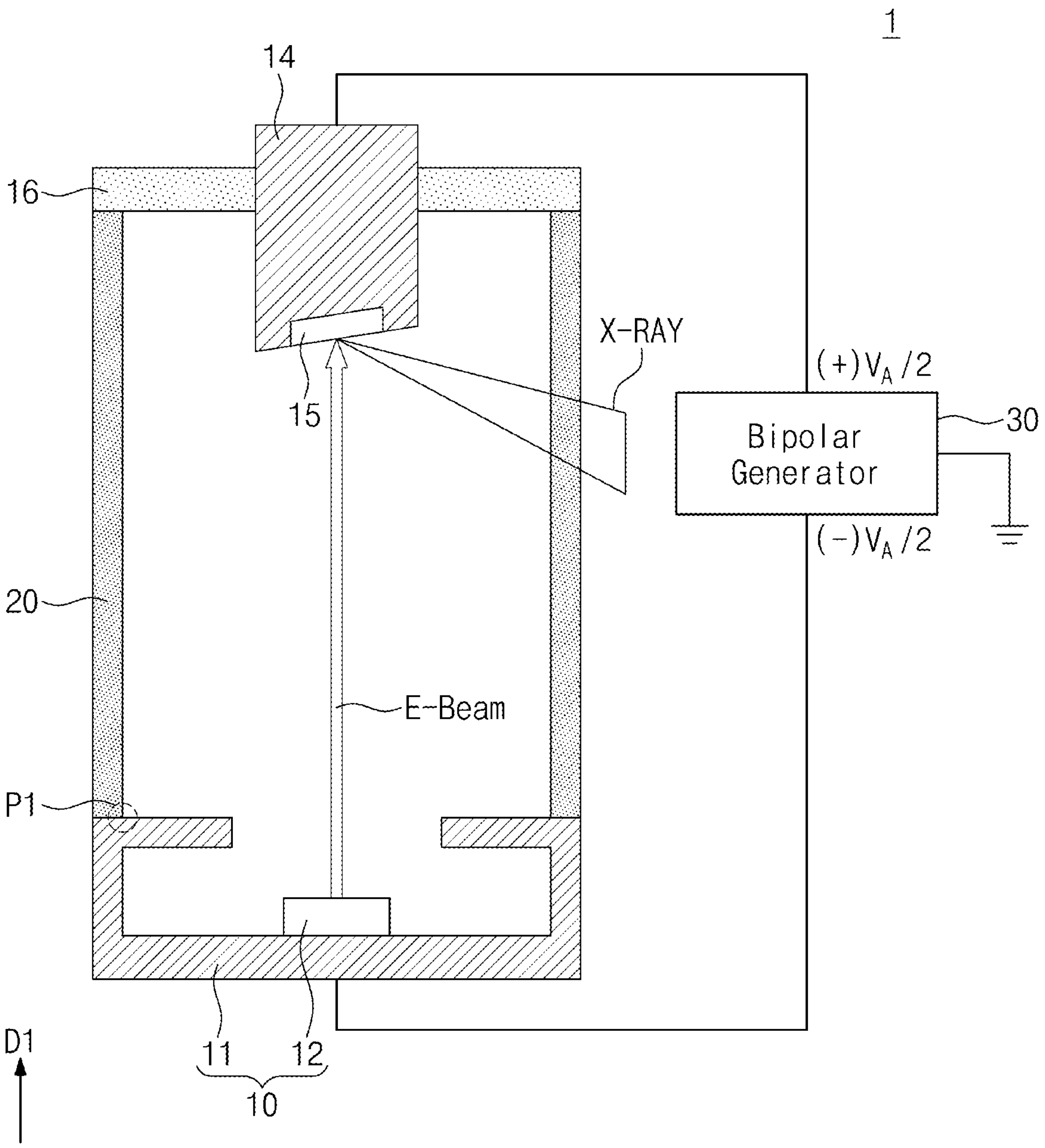
FIGS. 1 and 2 are schematic cross-sectional views illustrating a structure of an X-ray tube.
Figure 2:
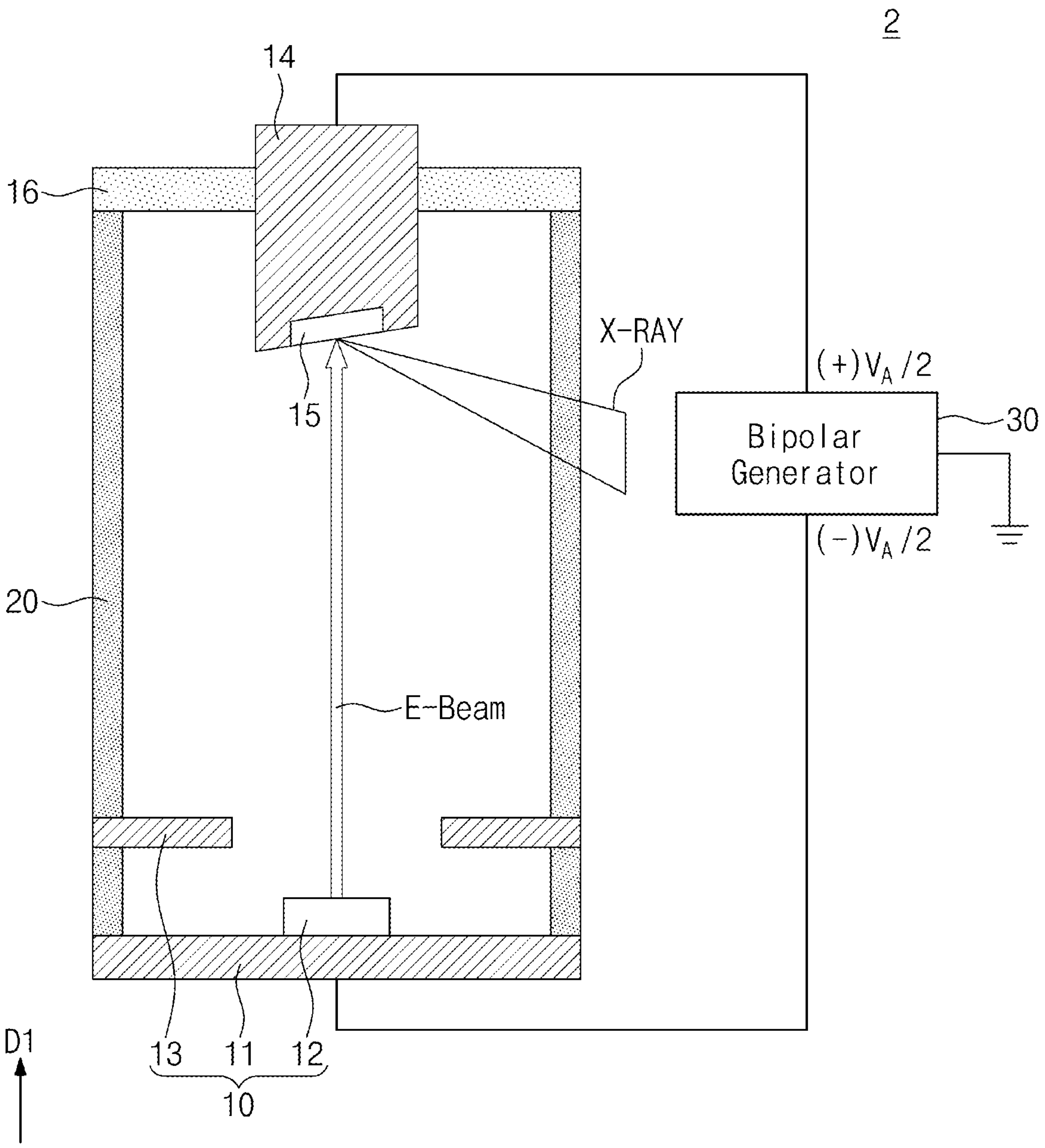

FIGS. 1 and 2 are schematic cross-sectional views illustrating a structure of an X-ray tube.

Referring to FIG. 1, an X-ray tube 1 may include a cathode structure 10, an anode 14, a target 15, a spacer structure 20, and a vacuum cap 16. For example, the cathode structure 10 may include a cathode 11 and an emitter 12. In this specification, the cathode 11 may be referred to as a first electrode 11, and the anode 14 may be referred to as a second electrode 14.

The cathode 11 and the anode 14 may be spaced apart from each other in a first direction D1 while facing each other. In this specification, the first direction D1 indicates a direction perpendicular to a top surface of the cathode 11. Alternatively, the first direction D1 indicates a direction heading to the anode 14.

Each of the anode 14 and the cathode 11 may include a conductive material, e.g., a metal material such as copper (Cu), aluminium (Al), and molybdenum (Mo). The anode 14 may be a rotary-type anode rotating in one direction or a fixed-type anode.

The target may be disposed at a lower portion of the anode 14. A bottom surface of the target 15, i.e., a surface of the target 15 facing the cathode 11, may be inclined. According to some embodiments, the target 15 may include the same material as the anode 14. In this case, the target 15 may correspond to one portion of the anode to which an E-beam is collected. According to some embodiments, the target 15 may include a material different from that of the anode 14. For example, the target 15 may include at least one of molybdenum (Mo), tantalum (Ta), tungsten (W), copper (Cu), and gold (Au).

When the emitter 12 includes a dot array of carbon nanotubes or a plurality of carbon nanotube yarns, electrons (or an E-beam) may be emitted from the dot array of the carbon nanotubes (or the plurality of carbon nanotube yarns) by electric field. When the emitter 12 includes a filament, electrons (or an E-beam) may be emitted by heat.

The E-beam emitted from the emitter 12 may be generated and accelerated in a vacuum state. The E-beam emitted from the emitter 12 may be collected to the target 15. The E-beam collides with the target 15 to generate an X-ray. The X-ray may be emitted to the outside through a window passing through the spacer structure 20. The window may include a material that almost does not absorb an X-ray, e.g., beryllium (Be) and copper (Cu).

In order to make the vacuum state, the X-ray tube may be manufactured to have a completely sealed state. Alternatively, the inside of the X-ray tube may have the vacuum state through a vacuum pump (not shown) connected to the outside according to manufacturing methods.

The spacer structure 20 may have a cylindrical tube shape. The spacer structure 20 may surround the anode 14. The spacer structure 20 may include a material that is rigid even in the vacuum state. For example, the spacer structure 20 may include an insulating material. The spacer structure 20 will be described in detail later with reference to FIG. 3.

Each of the cathode 11 and the anode 14 may be electrically connected with an external power supply 30. For example, the external power supply 30 may be a bipolar generator. The external power supply 30 may be additionally connected to a ground power. For example, the external power supply 30 may apply a potential of a negative tube voltage $V_A/2$ to the cathode 11 and a potential of a positive tube voltage $V_A/2$ to the anode 14. The X-ray tube may operate with bipolar driving of a negative voltage having a difference between (−) $V_A/2$ and the ground and a positive voltage having a difference between the ground and (+)$V_A/2$. The entire tube voltage $V_A$ is applied to the spacer structure 20 even when the X-ray tube operates with bipolar driving. Thus, a dielectric strength of the spacer structure 20 may have a limitation, and a charging phenomenon in which charges are accumulated in an insulating material of the spacer structure 20 may increase as the tube voltage $V_A$ increases. To prevent this phenomenon, an amplitude of the tube voltage may be restricted. Also, since the ground that is a reference of direct voltage application to the X-ray tube is not connected, a stable operation may be difficult.

Some electrons of the E-beam emitted from the emitter 12 may be deviated from a normal trajectory and collide with the spacer structure 20. Under a high voltage condition, electrons may be emitted from a triple point (or a triple junction) in addition to the electrons of the E-beam emitted from the emitter 12. The triple point corresponds to a point at which vacuum, metal, and an insulating material, which have different dielectric constants, meet. In the X-ray tube 1 of FIG. 1, a limitation of the triple point may be the most severe at a point P1 at which the cathode 11 meets the insulating material of the spacer structure 20 due to the high voltage applied to the anode 14. That is, a strong electric field may be induced to the triple point P1 by the high voltage applied to the anode 14, and accordingly, unwanted electrons may be emitted from the triple point P1. The emitted electrons may collide with the spacer structure 20. Also, some electrons of the E-beam may collide with the target 15 and be scattered to collide with the spacer structure 20. As the electrons collide with the spacer structure 20, secondary electrons may be emitted from the spacer structure 20, and the spacer structure 20 may be charged to have a positive charge. When positive charges are accumulated in the spacer structure 20 under the high voltage, the risk of arcing may exist, which causes a limitation in operation stability, i.e., reliability, of the X-ray tube.

In an X-ray tube 2 of FIG. 2, a cathode structure 10 may further include at least one additional electrode 13 disposed between a cathode 11 and an anode 14. The additional electrode 13 may be one of a gate and an E-beam focusing electrode (lens).

For example, the additional electrode 13 may be a gate and contact a spacer structure 20. In this case, a voltage having a potential higher than that of the cathode 11 may be applied to the gate. The gate 13 may be disposed above the cathode 11 and include an opening at a position corresponding to an emitter 12. For example, the gate 13 may have a mesh shape or a grid shape.

Figure 3:
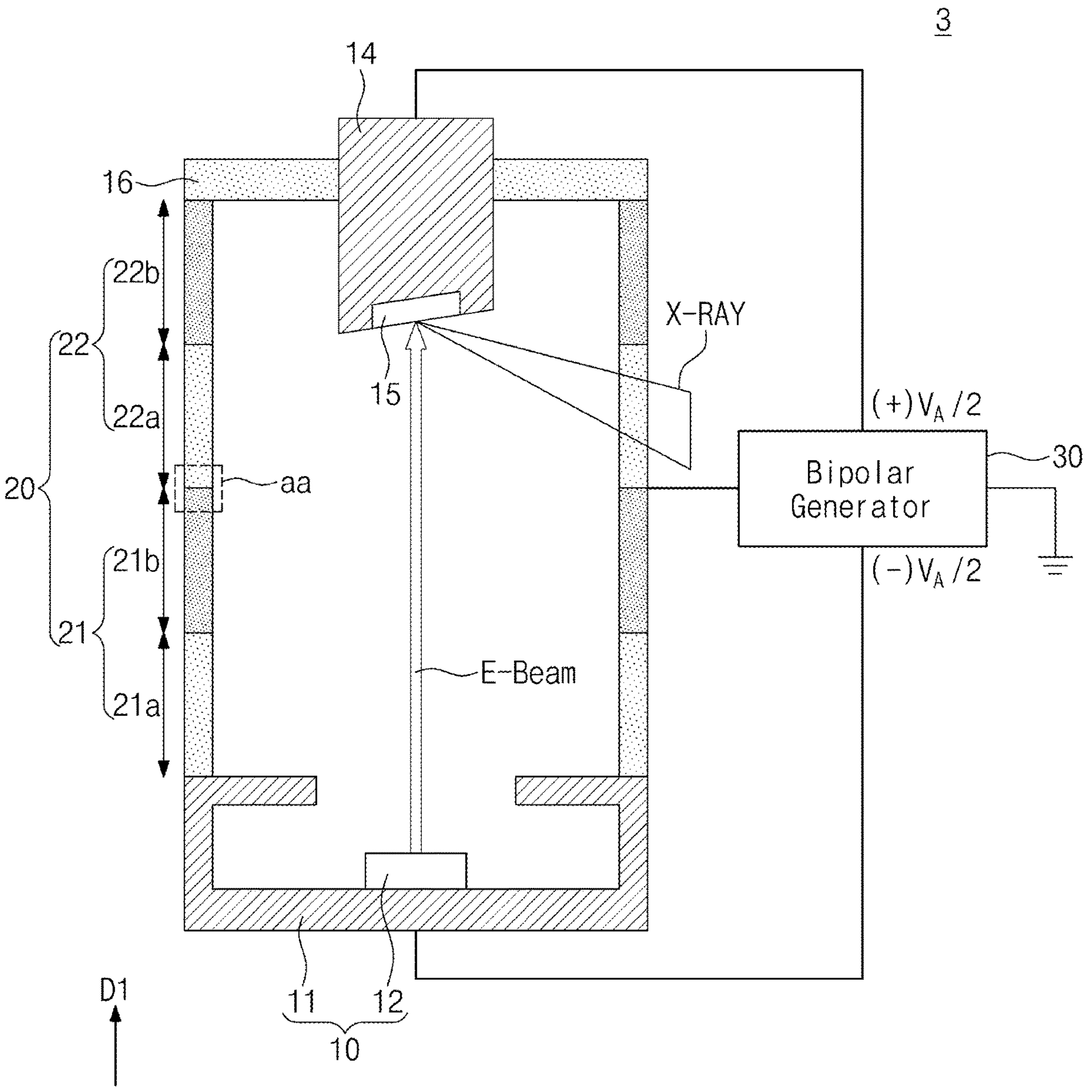
FIG. 3 is a cross-sectional view illustrating a structure of an X-ray tube according to an embodiment of the inventive concept.

FIG. 3 is a cross-sectional view illustrating a structure of an X-ray tube according to an embodiment of the inventive concept. Since features of FIG. 3 overlap those described in FIGS. 1 and 2 except for features to be described below, descriptions thereof will be omitted.

Referring to FIGS. 3, a spacer structure 20 may include a first spacer 21 and a second spacer 22. Also, a contact point of the first spacer 21 and the second spacer 22 may be directly connected to a ground power.

Specifically, the first spacer 21 may be disposed closer to a cathode structure 10 than an anode 14. The second spacer 22 may be disposed on the first spacer 21 and disposed adjacent to the anode 14. A first portion 21_a_ and a second portion 21_b_ may be coupled into one body to provide the first spacer 21. A third portion 22_a_ and a fourth portion 22_b_ may be coupled into one body to provide the second spacer 22.

The first spacer 21 may include the first portion 21_a_ and the second portion 21_b_ disposed on the first portion 21_a_. The second spacer 22 may include the third portion 22_a_ and the fourth portion 22_b_ disposed on the third portion 22_a_. The first portion 21_a_ and the fourth portion 22_b_ may be spaced apart from each other with the second portion 21_b_ and the third portion 22_b_ therebetween.

Each of the first portion 21_a_ and the third portion 22_a_ may include a low-resistance insulating material, and each of the second portion 21_b_ and the fourth portion 22_b_ may include a high-resistance insulating material. In this specification, the low-resistance insulating material and the high-resistance insulating material are defined according to a volume resistivity (or a resistivity). The low-resistance insulating material may be defined as a material having a resistivity of about $10^{12}$ Ω·cm or less, and the high-resistance insulating material may be defined as a material having a resistivity greater than about $10^{12}$ Ω·cm.

Each of the low-resistance insulating material and the high-resistance insulating material may include a ceramic insulating material and impurities distributed in the ceramic insulating material (e.g., conductive dopants). According to some embodiments, the high-resistance insulating material may almost not include the impurities (e.g., conductive dopants). The conductive dopants may be uniformly distributed in the ceramic insulating material.

The ceramic insulating material may include at least one of alumina ($Al_2O_3$), zirconia ($ZrO_2$), and yttria ($Y_2O_3$). The conductive dopants may include a titanium oxide (TixOy, x=1~3, y=1~3). For example, the ceramic insulating material may include alumina ($Al_2O_3$), and the conductive dopant may include titania ($TiO_2$). An amount of the conductive dopant in the low-resistance insulating material may be about 2 wt % or more. An amount of the conductive dopant in the high-resistance insulating material may be less than about 2 wt %.

When all of the first to fourth portions 21_a_, 21_b_, 22_a_, and 22_b_ include the titanium oxide (TixOy, x=1~3, y=1~3), a concentration of $Ti_2O_3$ and/or TiO of each of the first portion 21_a_ and the third portion 22_a_ may be greater than that of $Ti_2O_3$ and/or TiO of each of the second portion 21_b_ and the fourth portion 22_b_.

According to some embodiments, each of the first portion 21_a_ and the second portion 21_b_ may include a different kind of ceramic insulating material, and each of the third portion 22_a_ and the fourth portion 22_b_ may include a different kind of ceramic insulating material. For example, the first portion 21_a_ may include a first ceramic insulating material having a low resistivity, and the second portion 21_b_ may include a second ceramic insulating material having a resistivity greater than that of the first ceramic insulating material.

The first spacer 21 and the second spacer 22 according to an embodiment of the inventive concept may be formed through a method described below. In case of the first spacer 21, for example, based on a total amount of an alumina ($Al_2O_3$) insulating material contained in an additive, sintering may be performed by adding titania ($TiO_2$) greater than about 2 wt % to one portion of the alumina (corresponding to the first portion 21_a_ of the first spacer 21) and adding titania ($TiO_2$) of about 2 wt % or less to the rest portion of the alumina (corresponding to the second portion 21_b_ of the first spacer 21). As heat treatment is performed at a high temperature under a hydrogen gas atmosphere, the first portion 21_a_ and the second portion 21_b_ of the first spacer 21 may be formed. At least a portion of the titanium dioxide ($TiO_2$) may be reduced under the hydrogen gas atmosphere to form the $Ti_2O_3$ and/or the TiO.

Figure 4A:
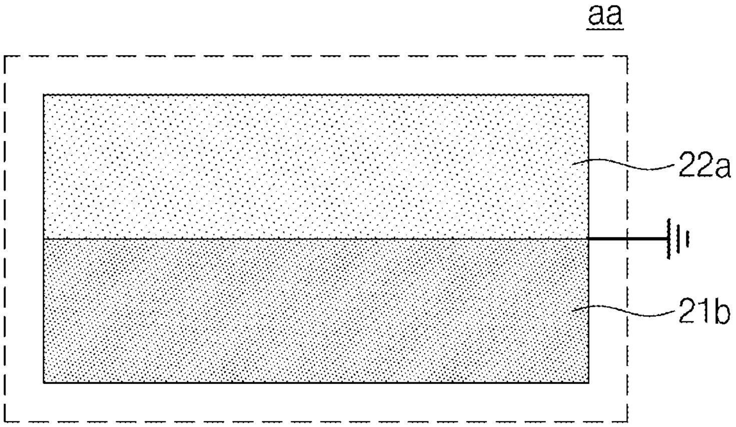
FIGS. 4A and 4B are enlarged views corresponding to an area aa of FIG. 3.
Figure 4B:
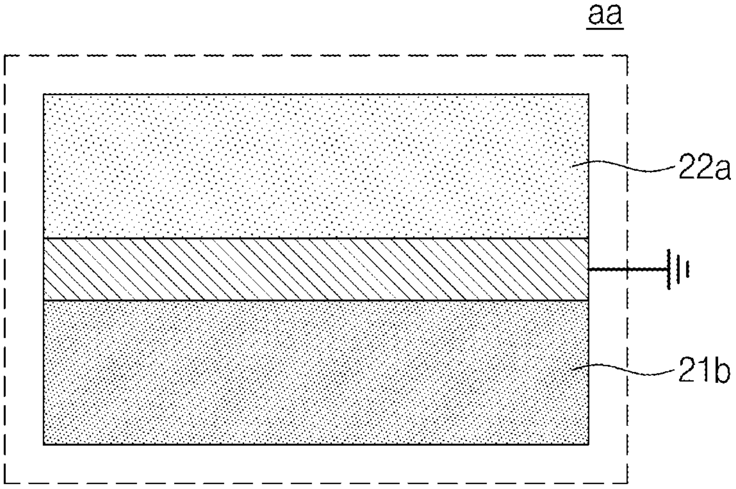

FIGS. 4A and 4B are enlarged views corresponding to an area aa of FIG. 3.

Referring to FIGS. 3 and 4A, according to some embodiments, the second portion 21_b_ and the third portion 22_a_ may directly contact each other. The ground power may be connected to a contact point therebetween.

Referring to FIGS. 3 and 4B, according to some embodiments, a metal layer may be disposed between the second portion 21_b_ and the third portion 22_a_. The metal layer may be disposed at a position of a contact point of the second portion 21_b_ and the third portion 22_a_. The ground power may be connected to the metal layer.

According to an embodiment of the inventive concept, each of the first portion 21_a_ and the third portion 22_a_ may have a resistance that is remarkably lower than that of each of the second portion 21_b_ and the fourth portion 22_b_. Accordingly, a high voltage of several tens kV or more, which is applied between the cathode structure 10 and the ground ($(-)V_A/2$ to ground) and between the ground to the anode ($(+)$ground to $V_A/2$) in an X-ray tube 3, is insulated by the second portion 21_b_ and the fourth portion 22_b_. Also, since each of the first portion 21_a_ and the third portion 22_a_ has high electrical conductivity, the electric field at the triple point may be weakened to suppress E-beam generation at the triple point. Also, the charging phenomenon in which charges are accumulated in the spacer structure 20 may be suppressed by a portion of an E-beam generated from the cathode structure 10 and then distorted in path to head toward the spacer structure 20 and an E-beam scattered behind the target 15. As a result, stability of the X-ray tube operating under the high voltage may be remarkably improved, and a path of the E-beam heading toward the target in the X-ray tube may be stably adjusted.

Figure 5:
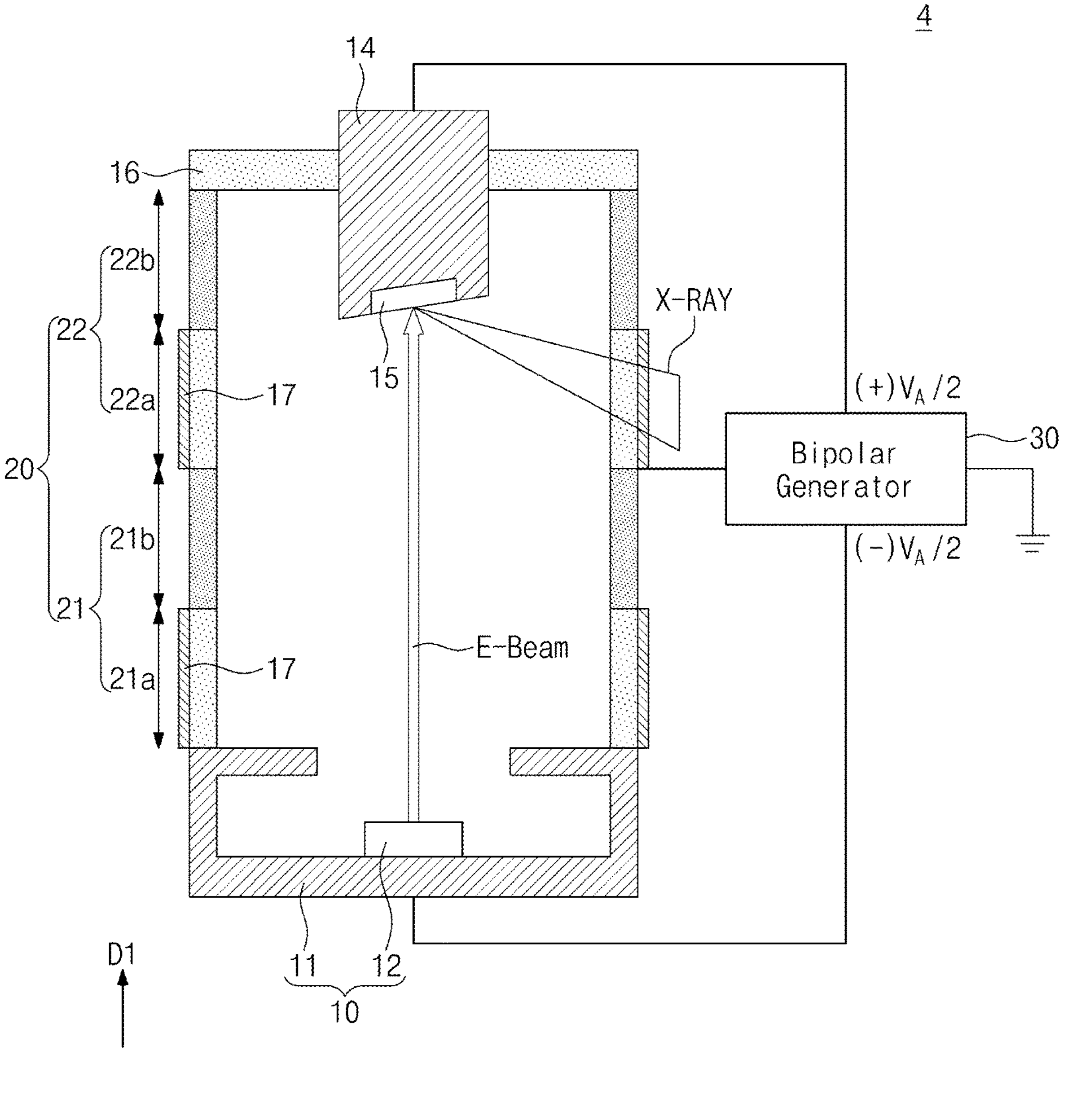
FIG. 5 is a cross-sectional view illustrating a structure of an X-ray tube according to some embodiments.

FIG. 5 is a cross-sectional view illustrating a structure of an X-ray tube according to some embodiments. Since features of FIG. 5 overlap those described in FIG. 3 except for features to be described below, descriptions thereof will be omitted.

Referring to FIG. 5, metal layers 17 may be selectively provided to an outer circumferential surface of at least one of a first portion 21_a_ and a third portion 22_a_. The metal layers 17 may not be provided to an outer circumferential surface of each of a second portion 21_b_ and a fourth portion 22_b_. Each of the metal layers 17 may directly contact the first portion 21_a_ and the third portion 22_a_. Each of the metal layers 17 may include a metal material such as, e.g., copper. The metal layer 17 may be a thin film (e.g., a thin film having a thickness of about 1 μm or less) that is directly applied onto the first portion 21_a_ and the third portion 22_a_ or a thick film (e.g., a thin film having a thickness greater than about 1 μm) have a bulk shape. The metal layer 17 may be electrically grounded to further suppress the charging phenomenon.

Figure 6:
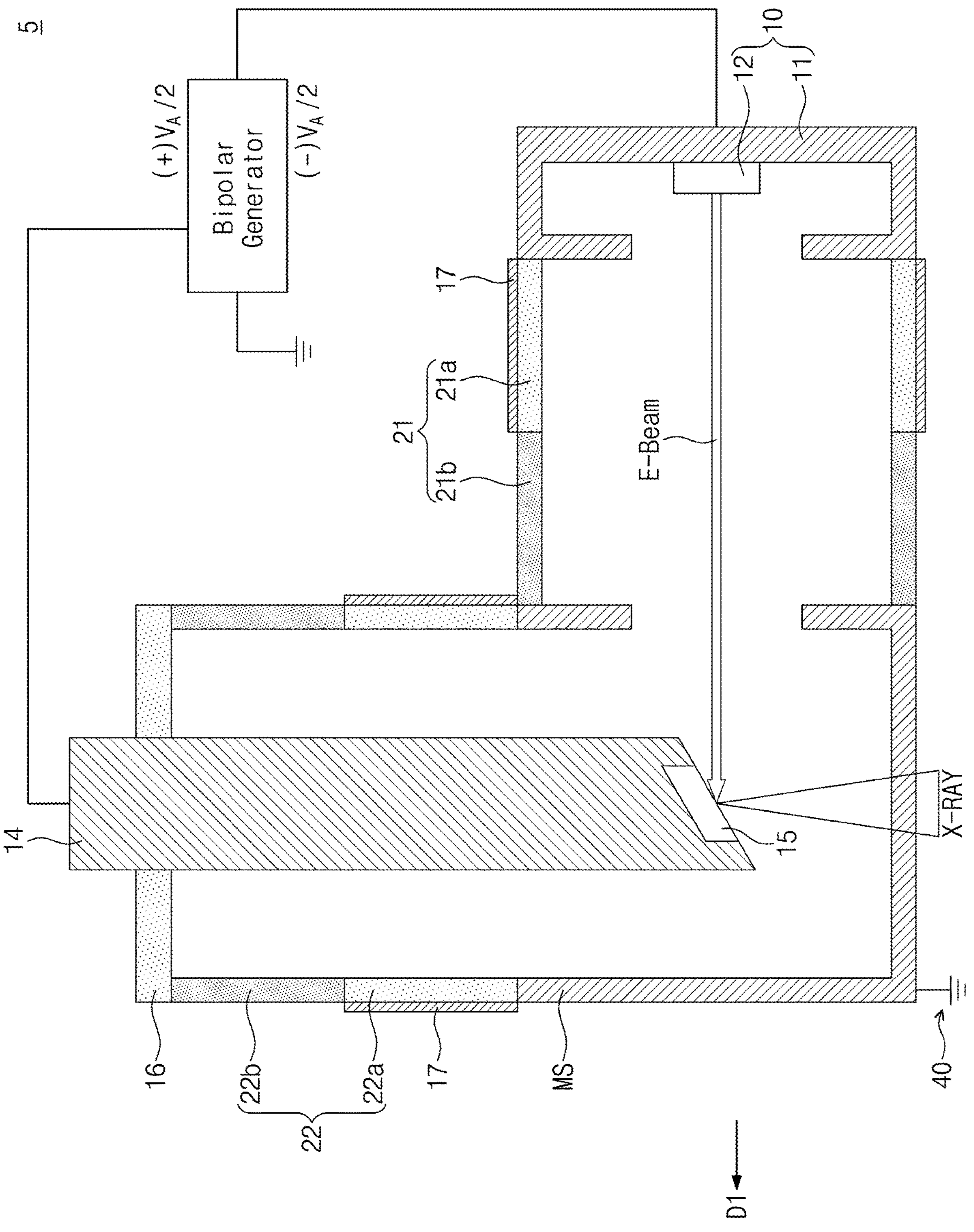
FIG. 6 is a cross-sectional view illustrating a structure of an X-ray tube according to some embodiments.

FIG. 6 is a cross-sectional view illustrating a structure of an X-ray tube according to some embodiments. Since features of FIG. 6 overlap those described in FIG. 3 except for features to be described below, descriptions thereof will be omitted.

Referring to FIG. 6, an X-ray tube 5 according to some embodiments may include a conductive structure MS disposed between a first spacer 21 and a second spacer 22. The conductive structure MS may include, e.g., a metal alloy. The metal alloy may include kovar or super kovar including iron, nickel, and cobalt.

The conductive structure MS may have a bent tube shape. For example, one side surface of the conductive structure MS may have an "L"-shape. An emitter 12 may be spaced horizontally from a target 15, and a window may be spaced vertically from the target 15. Positions and arrangement of the emitter 12, the target 15, and the window may be adjusted by adjusting the shape of the conductive structure MS. The window may be disposed on an area of the conductive structure MS, which vertically overlaps the target 15. Specifically, the window may pass through the conductive structure MS. The conductive structure MS may be connected to a ground power. An object to be inspected for obtaining an image may be disposed adjacent to a focal point of the target 15 through the conductive structure MS, and thus an X-ray image having a high magnification may be easily obtained.

According to the embodiment of the inventive concept, the X-ray tube may be stably driven by adjusting the resistivity of the spacer even when the high voltage is applied under the bipolar driving.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An X-ray tube comprising:

a cathode structure;

an anode spaced apart from the cathode structure;

a spacer structure disposed between the cathode structure and the anode; and an external power supply connected to each of the cathode structure, the anode, and the spacer structure, wherein the spacer structure comprises:

a first spacer disposed adjacent to the cathode structure; and a second spacer disposed on the first spacer and disposed adjacent to the anode, wherein the first spacer comprises a first portion adjacent to the cathode structure and a second portion adjacent to a contact point of the first spacer and the second spacer, the second spacer comprises a third portion adjacent to the contact point and a fourth portion adjacent to the anode, the first portion and the fourth portion are spaced apart from each other with the second portion and the third portion therebetween, and each of the first portion and the third portion has a volume resistivity less than that of the second portion.

2. The X-ray tube of claim 1, wherein the fourth portion has a volume resistivity greater than that of the third portion.

3. The X-ray tube of claim 1, wherein the external power supply applies a ground voltage to the contact point, a negative voltage is applied to the cathode structure, and a positive voltage is applied to the anode.

4. The X-ray tube of claim 1, wherein the cathode structure comprises:

a cathode; and an emitter disposed on the cathode, wherein the first portion contacts the cathode.

5. The X-ray tube of claim 1, wherein the cathode structure comprises:

a cathode;

an emitter disposed on the cathode; and an additional electrode disposed over the cathode and the emitter, wherein the additional electrode comprises an opening that exposes the emitter, and the first portion contacts the additional electrode.

6. The X-ray tube of claim 1, wherein the cathode structure comprises:

a cathode;

an emitter disposed on the cathode; and a plurality of additional electrodes that are spaced vertically from each other between the cathode and the anode, wherein each of the additional electrodes comprises an opening that exposes the emitter, and the first portion contacts the additional electrode disposed closest to the anode among the additional electrodes.

7. The X-ray tube of claim 1, further comprising a metal layer disposed between the second portion and the third portion, wherein the metal layer is disposed at the contact point.

8. The X-ray tube of claim 1, wherein each of the first spacer and the second spacer comprises a ceramic material, and the ceramic material comprises at least one of alumina ($Al_2O_3$), zirconia ($ZrO_2$), and yttria ($Y_2O_3$).

9. The X-ray tube of claim 8, wherein the first spacer and the second spacer comprise the same ceramic material and further comprise impurities doped in the ceramic material, and a concentration of impurities of each of the first portion and the third portion is greater than that of the second portion.

10. The X-ray tube of claim 9, wherein the concentration of the impurities of the third portion is greater than that of the fourth portion.

11. The X-ray tube of claim 8, wherein the first spacer and the second spacer comprise different ceramic materials.

12. The X-ray tube of claim 1, wherein each of the first portion and the third portion has a resistivity of about $1\times10^{12}$ Ω·cm or less, and each of the second portion and the fourth portion has a resistivity greater than about $1\times10^{12}$ Ω·cm.

13. The X-ray tube of claim 1, further comprising at least one metal layer disposed on at least one of outer circumferential surfaces of the first portion and the third portion.

14. The X-ray tube of claim 1, further comprising a conductive structure disposed between the first spacer and the second spacer, wherein the conductive structure has a curved shape.

15. The X-ray tube of claim 14, further comprising a window passing through the conductive structure.

16. The X-ray tube of claim 15, wherein the conductive structure is connected to a ground power.

* * * * *